(12) United States Patent
Dunn (10) Patent No.: US 6,817,166 B2
(45) Date of Patent: Nov. 16, 2004

(54) CROP FEED DRAPER FOR A HEADER

(75) Inventor: James Thomas Dunn, Manitoba (CA)

(73) Assignee: MacDon IndustriesLtd., Manitoba (CA)

( * ) Notice: Subject to any disclaimer, the term of this patent is extended or adjusted under 35 U.S.C. 154(b) by 0 days.

(21) Appl. No.: 10/617,889

(22) Filed: Jul. 14, 2003

(65) Prior Publication Data

US 2004/0148919 A1 Aug. 5, 2004

(51) Int. Cl.$^7$ .......................... A01D 67/00; A01D 34/12
(52) U.S. Cl. ..................... 56/16.4 R; 56/14.4; 56/181
(58) Field of Search .................. 56/14.4–14.9, 56/16.4 R, 16.5, 16.4 A–16.4 D, 16.7–16.9, 181, 128, 179, 208–228; 198/513, 523, 601; 460/20

(56) References Cited

U.S. PATENT DOCUMENTS

| | | | | |
|---|---|---|---|---|
| 2,893,537 A | * | 7/1959 | Krahn | 198/513 |
| 3,921,785 A | * | 11/1975 | Huitink | 198/601 |
| 4,216,641 A | * | 8/1980 | Koch et al. | 56/14.4 |
| 4,429,517 A | * | 2/1984 | Lohrentz et al. | 56/181 |
| 4,938,010 A | * | 7/1990 | Guinn et al. | 56/181 |
| 4,956,966 A | | 9/1990 | Patterson | |
| 5,005,343 A | | 4/1991 | Patterson | |
| 5,464,371 A | | 11/1995 | Honey | |
| RE35,543 E | * | 7/1997 | Patterson | 56/14.4 |
| 6,675,568 B2 | * | 1/2004 | Patterson et al. | 56/208 |

* cited by examiner

*Primary Examiner*—Robert E. Pezzuto
(74) *Attorney, Agent, or Firm*—Adrian D. Battison; Michael R. Williams; Ryan W. Dupuis

(57) ABSTRACT

A draper header includes two side drapers each running from an outer end guide roller at a first end of the header to an inner end guide roller adjacent the discharge location of the header and a central feed draper located at the discharge location and including a front guide roller just behind the cutter bar and running to a rear guide roller in front of the feeder house of the combine harvester. An auger is located between the discharge rollers with a front edge of the flight forward of the rear end of the discharge rollers to feed the material inwardly and underneath the auger to the inlet of the feeder house. The feed draper carries cleats which are angled to the rollers in two sections converging to a central leading apex to reduce forces on the cleat as they pass over the front guide roller which is of reduced diameter to fit within a small space adjacent the cutter bar. The connection at the ends of the draper canvas is also angled to the rollers so as to be parallel to the cleats and includes separate connectors having a convex shape.

23 Claims, 7 Drawing Sheets

CROP FEED DRAPER FOR A HEADER

This invention relates to header of a crop feed draper for a crop harvesting header.

BACKGROUND OF THE INVENTION

A header for a crop harvesting machine generally comprises a main longitudinal support member in the form of an elongate tube which extends across substantially the full width of the header frame and defines a main structural member for the header frame. The tube carries a plurality of forwardly and downwardly extending support beams which include a first portion extending downwardly and a second portion attached to a lower end of the first portion and extending forwardly therefrom toward a forward end of the support beams. The cutter bar is attached to the forward end of the support beams and is thus held thereby in a position generally parallel to the main support tube.

In U.S. Pat. No. 4,956,966 issued September 1990 and U.S. Pat. No. 5,005,343 issued April 1991 by Patterson and assigned to the present Assignee is disclosed a header which utilizes two side drapers to transport the crop cut by the knife inwardly along the header table to a central discharge opening. The side drapers discharge onto a central feed draper which has a front roller just behind the knife and a rear roller at the feeder house of a combine harvester so as to carry the crop from the side drapers rearwardly into the feeder house for inlet into the combine harvester for processing.

While the present invention is described hereinafter in relation to the construction suitable for and designed for feeding crop into the feeder house of a combine harvester, the arrangements described and claimed herein can also be used on a crop harvesting header for feeding crop from the side drapers into a crop conditioning system located behind the discharge opening between the side drapers.

A rotary feed member which may carry auger flight portions is mounted at the discharge opening of the header above the feed draper so as to assist in carrying bulky crop through the discharge opening so as to be carried into the feeder house. The feed draper is carried on the rear roller which is attached to a feeder house and therefore the feed draper and its associated underlying pan flex and twist as the header floats relative to the feeder house.

While this arrangement has achieved considerable commercial success, it is desirable to improve the feed of the crop material from the side drapers into the feeder house particularly in relation to bulky crops such as soy beans.

A subsequent U.S. Patent which is U.S. Pat. No. 5,464,371 issued November 1995 by Honey discloses a similar arrangement in which the crop is transferred from the rear end of the feed draper into a rigid fixed adapter housing which is mounted on the front of the feeder house and contains the rotary feed member in the form of an auger with conventional feeding fingers. This arrangement therefore requires that the header is moved forwardly relative to the feeder house so as to provide the space necessary for the adapter housing and its rotary feed member contained therein.

Further commercial devices are manufactured by Deere and Company and Agco but it is believed that there are no patents disclosing the construction of these devices.

Such arrangements employing a central feed draper between two side drapers are also used in supplying the crop from the side drapers into a crop conditioner located behind the feed draper.

The term "header" as used commonly and as used in this specification is intended to include both headers carried on self propelled machines, which may therefore not include wheels mounted on the header itself, and headers which are towed behind a tractor and thus may include wheels attached to the header frame or to a component supporting the header.

In most cases drapers of this type include cleats or ribs which extend transversely across the width of the draper canvas at positions spaced periodically along the length of the draper canvas so that each cleat provides an upstanding wall or shoulder engaging the crop and providing a force on the crop sufficient to accelerate the crop to improve its movement with the draper canvas. Textured surfaces have been found to provide insufficient force on the crop to cause the necessary movement of the crop with the draper thus allowing slippage or blockages to occur.

Typically such cleats on drapers used for crop transportation in headers of the above type are simply raised ribs or bars attached to the outer surface of the canvas and extending along a line at right angles to the side edges of the canvas. Such cleats are often reinforced by a rod inside the molded material of the cleat, which is generally a resilient natural or synthetic rubber material.

One problem which arises with drapers of this type is that the guide rollers are required to have a sufficient diameter so as to reduce the forces on the cleat as it passes around the roller, bearing in mind the forces on the cleat particularly at its leading and trailing edges which tend to lift the cleat away from the draper surface when the diameter of the roller is too small. Up until now, therefore, rollers for drapers of this type have generally had a diameter of the order of 3 to 3.5 inches and the minimum diameter roller which has been used in the above header of MacDon is 2.25 inches in outside diameter.

It will be appreciated, however, that the use of a larger diameter roller increases the area necessary for receiving that roller and, in the construction defined above, limits the ability of the design to locate the roller forwardly underneath the side drapers in a manner closely adjacent to the cutter bar.

Attention is directed to related application Ser. No. 10/618,070, filed Jul. 14, 2003, filed simultaneously with this application which claims some aspects of the apparatus disclosed herein.

SUMMARY OF THE INVENTION

It is one object of the present invention to provide a header in which the transfer of crop from the side drapers to the center feed draper is improved.

According to the invention there is provided a crop harvesting header comprising:

a main frame structure extending across between two ends of the header across a width of the header for movement in a direction generally at right angles to the width across ground including a crop to be harvested;

a crop receiving table carried on the main frame structure across the width of the header;

a cutter bar across a front of the table carrying a cutter operable for cutting the crop as the header is moved forwardly across the ground for depositing the crop onto the table;

and a crop transport system for moving the cut crop toward a discharge location of the header;

the crop transport system including a crop transport draper having a first end roller, a second end roller parallel to and spaced from the first end roller and a draper canvas wrapped around the rollers for movement around the rollers longitudinally of the canvas in a crop transporting direction;

the draper canvas having on its outer surface a plurality of generally transversely extending longitudinally spaced cleats attached to the outer surface and extending outwardly therefrom for engaging the cop and providing a longitudinal force on the crop;

each cleat comprising a strip of resilient material attached to the outer surface such that the length of the strip is at an angle to a line at right angles to the longitudinal direction so that, as the strip passes around the rollers, one end of the strip passes around angularly in advance of the other end.

The term "canvas" as used herein is not intended to be limited to nor to imply any particular material for the manufacture of the canvas since this is a term of art for the belt used in a draper.

Preferably each cleat comprises two strips of resilient material which are arranged at opposite angles to as to converge from outer ends of the strips adjacent sides of the canvas to an apex substantially on a center line of the draper canvas. However this construction is used to manufacture the draper in a symmetrical manner to provide effective tracking of the belt and may not be essential where other tracking arrangements are used. In these arrangements, the cleat may be inclined at a common angle across the full width of the canvas.

Preferably, to provide the best tracing and to avoid the formation of creases, the cleats are arranged on the canvas such that the apex is arranged in advance of the outer ends. However, again, this may be not be essential and the apex may trail.

Preferably the two strips are separated at the apex so as to leave a portion of the canvas at the center line which is free from the cleat. However again, this is not essential and the strips may be continuous across the width of the canvas and across the apex.

Preferably each cleat in cross-section is generally rectangular with a height greater than its width.

Preferably the angle is less than 15 degrees and preferably of the order of 5 degrees.

Preferably the canvas includes at least one end to end connection defined by two end portions of the canvas which are bent outwardly of the draper and connected together by threaded fasteners passing through the end portions to hold them connected and wherein the end portions are arranged at an angle to a line at right angles to the longitudinal direction so that, as the connection passes around the rollers, one end of the connection passes around angularly in advance of the other end.

Preferably the end connection is parallel to the cleats, that is it is inclined at the same angle and if the cleats are shaped to form the apex, the connector is shaped to form a symmetrical apex.

Preferably the end connection includes a plurality of pairs of separate reinforcing connectors each reinforcing connector having a pair of holes therein engaging onto a pair of the threaded fasteners which hold the pair of reinforcing connectors against the outside surfaces of the end portions, whereby the end connection can flex as it passes around the roller.

Preferably each reinforcing connector has a surface facing along the draper away from the end connection which is concave so as to match the convex surface of the roller.

The angled cleats are thus arranged to allow the cleats to pass over a roller which has an outer diameter less than 2.0 inches and more preferably as small as the order of 1.5 inches.

This arrangement of the draper and cleats is most particularly effective in a header where the crop transport system includes a first side draper having an outer end guide roller at a first end of the header, an inner end guide roller adjacent the discharge location and a continuous draper canvas wrapped around the outer and inner guide rollers to define a top run of the canvas for carrying the cut crop from the knife across the header to a discharge end adjacent the discharge location; and a second side draper having an outer end guide roller at a second end of the header, an inner end guide roller adjacent the discharge location and a continuous draper canvas wrapped around the outer and inner guide rollers to define a top run of the canvas for carrying the cut crop from the knife across the header to a discharge end adjacent the discharge location; wherein the crop transport draper comprises a feed draper located at the discharge location and including a front guide roller adjacent the cutter bar and a rear guide roller behind the front guide roller and a draper for carrying the crop material rearwardly toward a discharge opening of the header.

More particularly the arrangement may be one where the side drapers have a front edge at the cutter bar and the feed draper has a width greater than the spacing between the inner ends of the side drapers so as to extend underneath the inner ends of the side drapers with the front guide roller arranged close to the underside of the side drapers and to the cutter bar and the rear guide roller spaced away from the underside of the side drapers.

According to a second aspect of the invention there is provided a crop harvesting header comprising:

a main frame structure extending across between two ends of the header across a width of the header for movement in a direction generally at right angles to the width across ground including a crop to be harvested;

a crop receiving table carried on the main frame structure across the width of the header;

a cutter bar across a front of the table carrying a cutter operable for cutting the crop as the header is moved forwardly across the ground for depositing the crop onto the table;

and a crop transport system for moving the cut crop toward a discharge location of the header;

the crop transport system including a crop transport draper having a first end roller, a second end roller parallel to and spaced from the first end roller and a draper canvas wrapped around the rollers for movement around the rollers longitudinally of the canvas in a crop transporting direction;

wherein the canvas includes at least one end to end connection defined by two end portions of the canvas which are bent outwardly of the draper and connected together by threaded fasteners passing through the end portions to hold them connected and wherein the end portions are arranged at an angle to a line at right angles to the longitudinal direction so that, as the connection passes around the rollers, one end of the connection passes around angularly in advance of the other end.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

The header shown in the figures comprises a main frame 10 including a horizontal main support beam 11 extending along the length of the header along a first end 12 to a second end 13 of the header. The main frame includes forwardly extending frame members 14 at the ends of the header together with similarly arranged frame members intermediate the width of the header. At the front end of the frame members is mounted a cutter bar 15 which carries a sickle knife construction of a conventional nature. The frame 10 is attached to an adapter structure 16 attached to the feeder house 17 of a combine harvester 18.

The header includes a crop transportation system for transferring the crop from the sickle knife to the feeder house. This includes two side drapers 19 and 20 each of which includes a canvas extending from an outer guide roller 21 to an inner guide roller 22 so as to define an upper run of the canvas which carries the crop inwardly toward the center of the header. The canvas of the drapers 19 and 20 carries a plurality of transverse slats 19A.

At the center of the header is provided a feed draper 23 which has a front roller 24 just behind the cutter bar and a rear roller 25 thus defining an upper run of the canvas which carries the crop rearwardly toward the feeder house. The draper 23 carries slats 23A.

Headers of the general type described above are well known and the area with which the present invention is concerned is that of the feed section at the center of the header which carries the crop from the inner ends of the side drapers into the feeder house.

Figure 1:
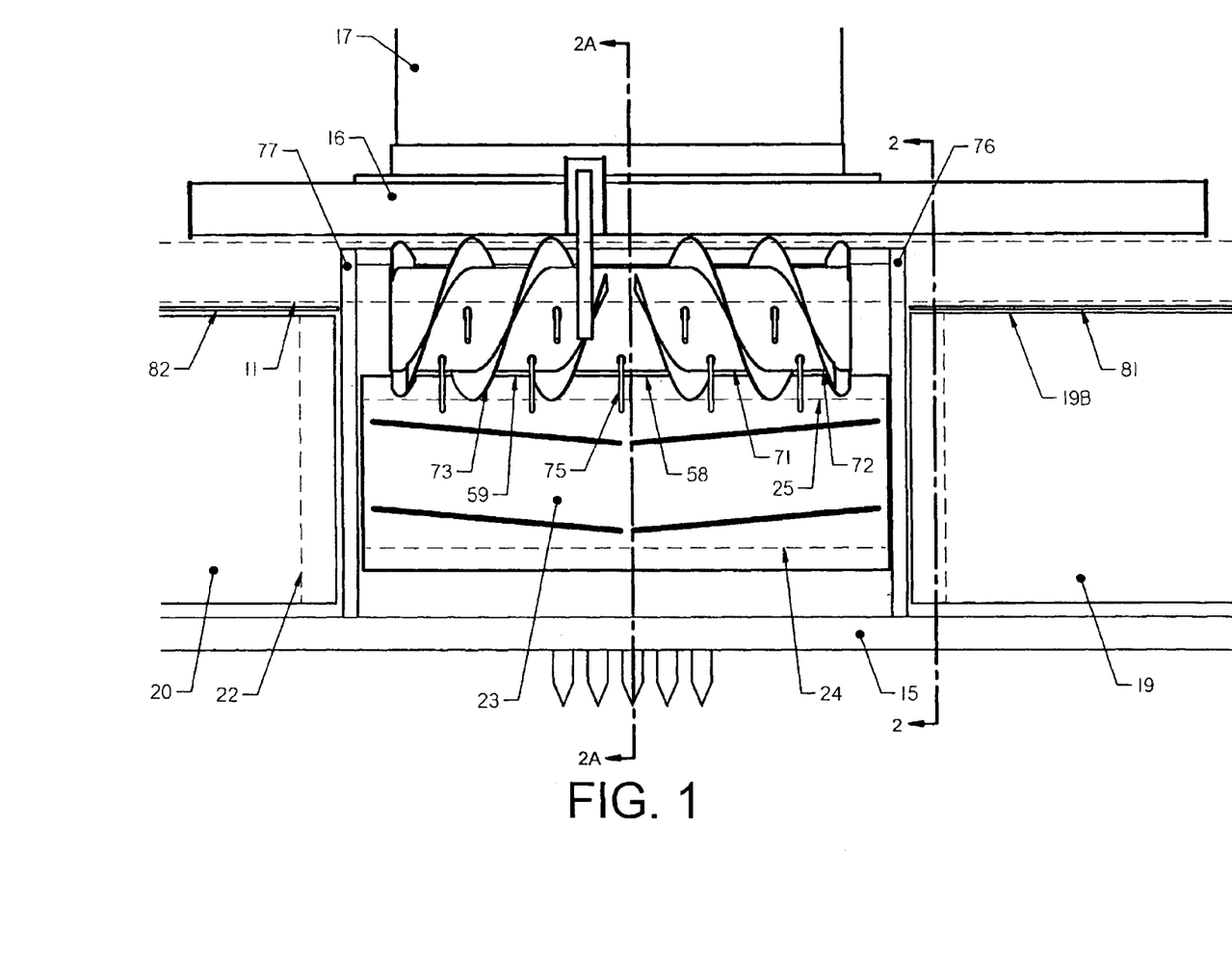
FIG. 1 is a top plan view of the center section only of a header according to the present invention with a number of elements such as the reel omitted for convenience of illustration.
Figure 2:
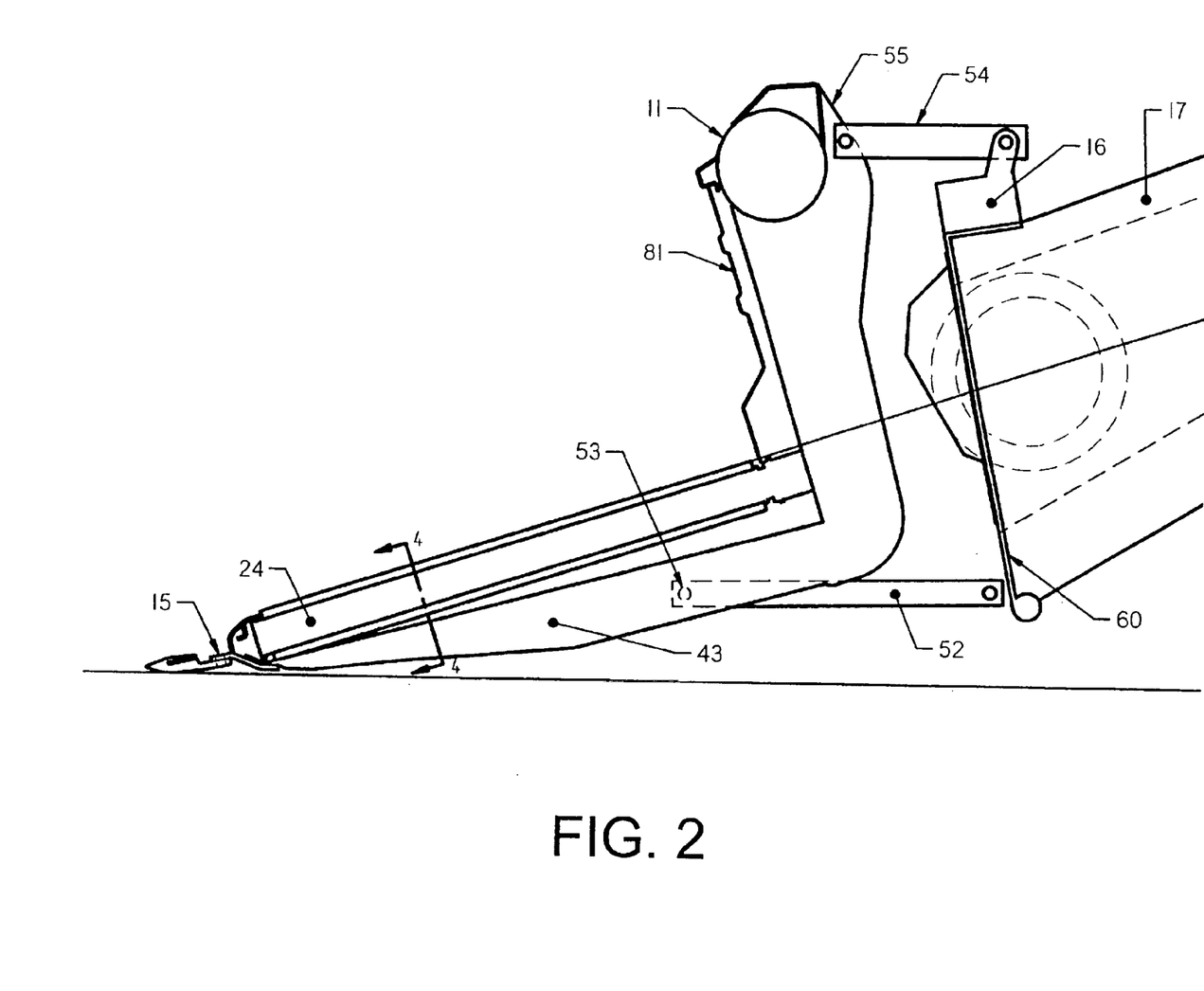
FIG. 2 is a cross sectional view along the lines 2—2 of the header of FIG. 1.
Figure 2A:
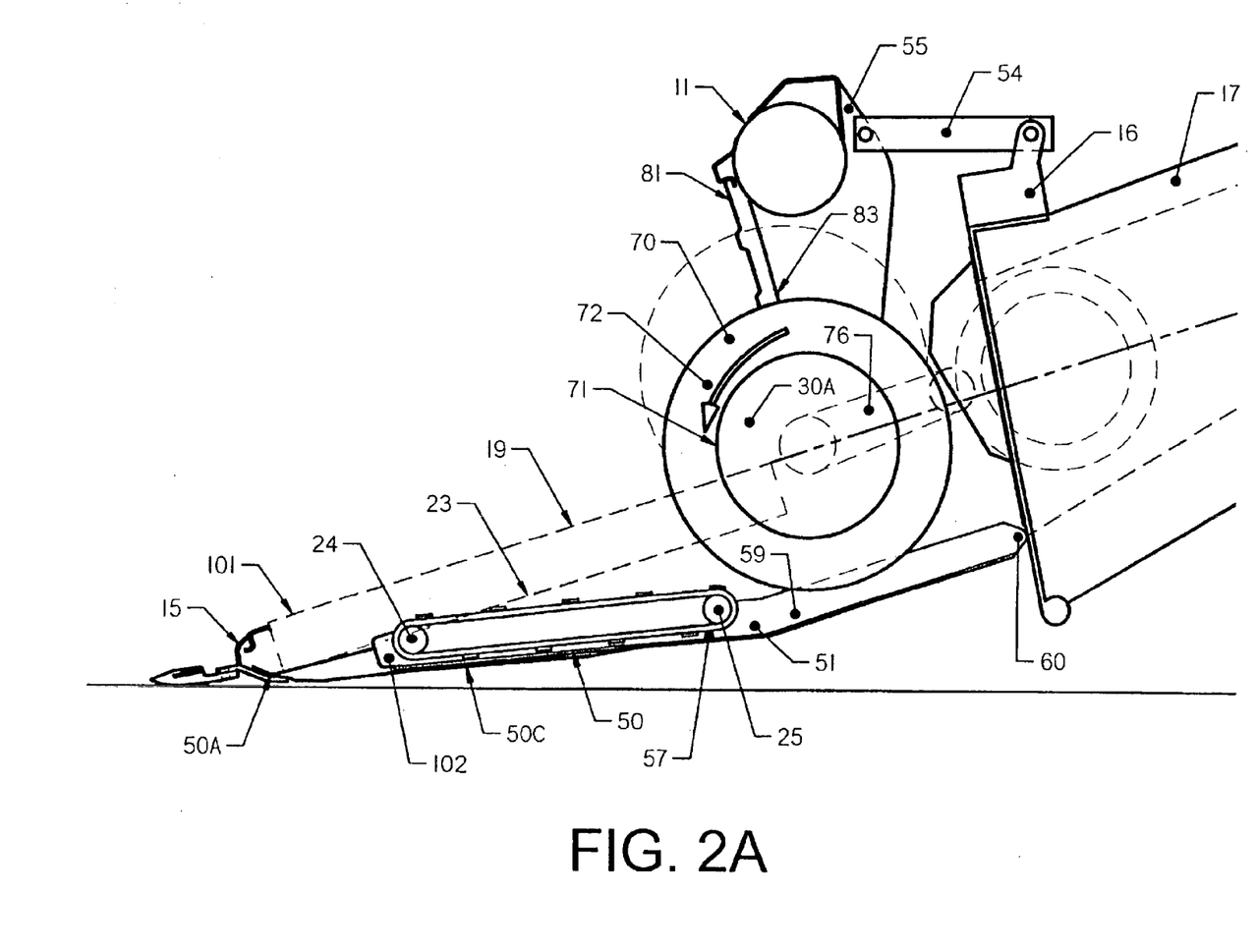
FIG. 2A is a cross sectional view along the lines 2A—2A of the header of FIG. 1.
Figure 3:
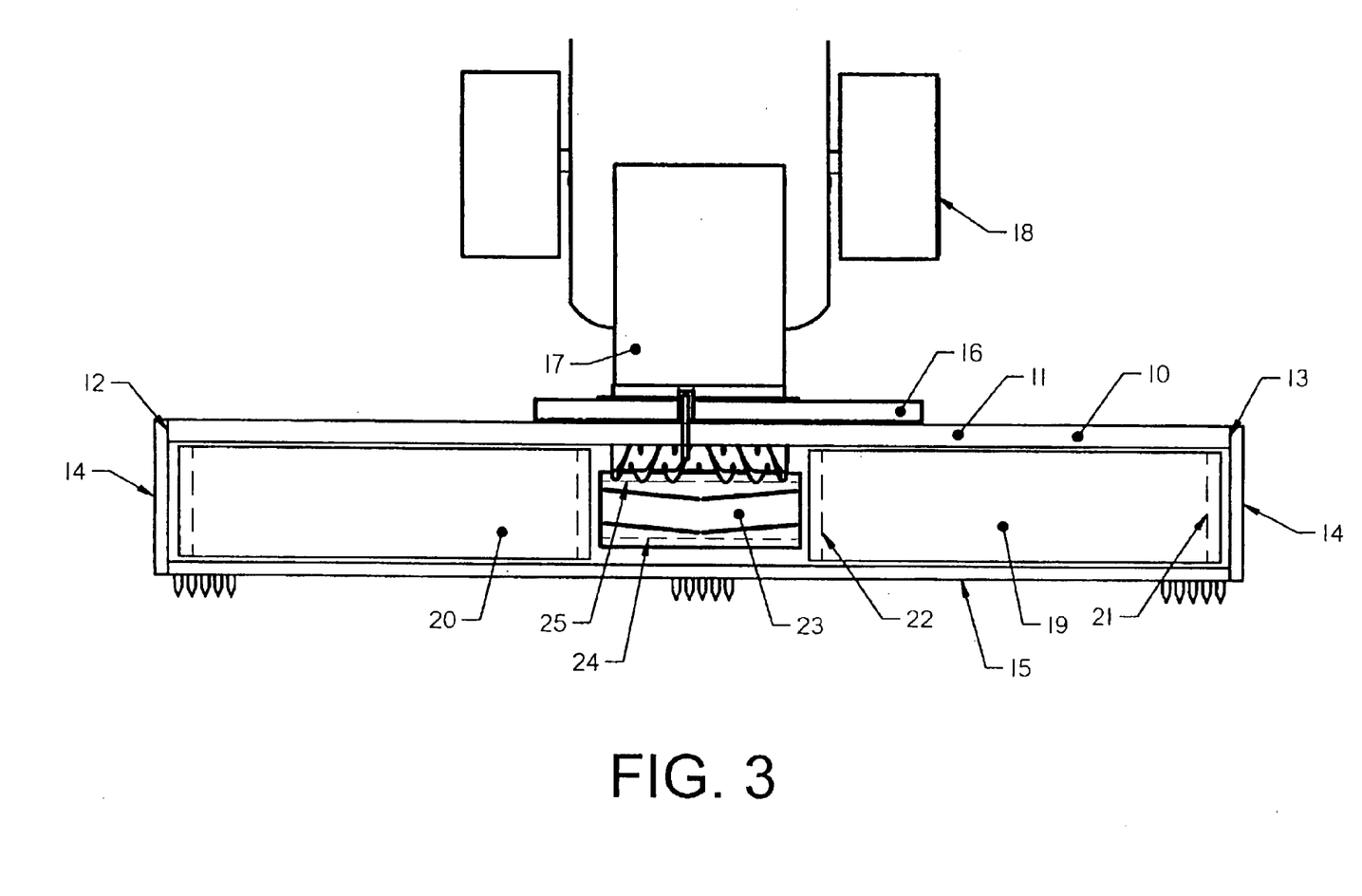
FIG. 3 is a top plan view of the complete header of FIG. 1 with a number of elements such as the reel omitted for convenience of illustration.

Turning now to FIGS. 2 and 2A, it will be noted that the front roller 24 of the feed draper 23 is carried on a support rearward of the cutter bar 15 so that it is fixed to the forward edge of the header. The rear roller 25 is carried on a bracket 57. Underneath the feed draper is mounted a pan member 50 which extends from the header at a forward end 50A at the cutter bar 15 at the front of and inwardly of the support frame member 43 rearwardly to a rear end 51.

The header including the main beam 11 and the frame element 43 is carried on the support frame 16 by two bottom links 52 which extend forwardly from the frame 16 under the header frame within a respective one of the arms 43 and support the header frame at a forward end 53 of the links 52. The links are supported on mounting springs (not shown). A top support link 54 extends forwardly from the frame 16 to a bracket 55 at the beam 11. Thus the header can move upwardly and downwardly in a floating action and can also twist side to side about a generally horizontal forwardly extending axis by a differential in the lifting of the links 52.

Immediately behind the rear end of the draper 23 is provided a forward end 58 of a guide sheet 59 which extends from the rear end of the draper 23 rearwardly to a rear end 60 at the feeder house.

The feed draper 23 and the pan or guide sheet 59 are mounted on two parallel side arms which extend to a rear end 60 of the pan 59 at which point the arms are pivoted to the feeder house. The front end of each arm is supported by the cutter bar at the forward end 50A of the pan 50. The front roller 24 of the feed draper is mounted between the arms rearward of the cutter bar. The rear roller 25 is mounted between the arms rearward of the front roller. The pan 59 is mounted between the arms and extends from the rear feed draper roller to the front of the feeder house at the frame 16. It is necessary for the arms, draper and pan 59 to flex and pivot to accommodate the floating and pivoting action of the header. The rear roller 25 of the draper 23 is thus mounted on the arms and therefore also the draper 23 flexes and twists to accommodate such movement.

The pan 50 may comprise a removable cover 50C underneath the feed draper and the pan 59 both of which span the arms and thus define a common structure. Thus both the draper and the pan 59 pivot about the mounting at the rear end 60 at the frame 16.

The sheet 59 has a width substantially equal to the width of the draper 23 so that the material discharged from the draper across the full width of the draper is carried rearwardly over the sheet to the feeder house. The feed draper is preferably wider than the space between the side drapers so that the feed draper extends underneath the side drapers to carry the crop therefrom and to reduce the possibility of crop back feeding underneath the side drapers.

The movement of the crop material to the feeder house is assisted by a rotary feed member 70 carried above the sheet 59 with a width substantially equal to the width of the sheet 59. The rotary feed member 70 includes a drum 71 which carries on its outside surface two helical auger sections 72 and 73 arranged at respective ends of the drum and arranged so that rotation of the drum in a counter clockwise direction so as to carry the crop material underneath the rotary feed member across the sheet 59 causes the crop material at the side edges of the sheet to be drawn inwardly toward a center of the sheet. At the center of the drum 71 is provided a plurality of fingers or other projecting members as indicated at 75 which direct the crop material rearwardly to enter the feeder house 17. Thus it will be noted that the rotary feed member is wider than the feeder house. The rotary feed member has a length so that it fits just inside side drapers 19 and 20. The rotary feed member has a diameter so that its forward edge substantially directly overlies the rear edge of the feed draper and the forward edge of the sheet 59 so that it can pick up material from the rear of the draper and carry that material rearwardly. Thus the forward edge of the rotary feed member projects to a position forward of a rear edge 30A of a rear edge 19B of the draper.

The rotary feed member is located such that the outside edge of the helical flights thereof and the outer edge of the fingers thereof lie in a cylinder which is closely positioned to the rear end of the feed draper. This distance is preferably of the order of 50 mm or less since such a small distance reduces the possibility of crop back-feeding underneath the feed draper and ensures that the crop is stripped from the feed draper by the rotary feed member.

The rotary feed member is carried on two side arms 76 and 77 which are mounted at their rear end on a transverse shaft 78 carried on the frame 16. The shaft 78 is positioned just in front of the front feeder chain pulley 80 so that the position of the rotary feed member 70 is maintained substantially constant relative to the feeder chain as the rotary feed member pivots upwardly and downwardly on the shaft 78 to accommodate changes in thickness of the crop on top of the sheet 59.

The rear of the header is defined by two rear sheets 81 and 82 on respective sides of the header which define an opening 83 at the rotary feed member so that the rotary feed member projects through the opening to operate in co-operation with the sheet 59 in the area at the rear of the header and on top of the sheet 59. Thus the position of the rotary feed member is such that it is behind the front of the header and forward of the rear part of the header and sits intermediate the rear wall of the header. The header is thus moved as far back close to the frame 16 as is physically possible and this positioning of the header is not influenced by the location of the rotary feed member. In addition the rotary feed member is of a size so that it can cooperate with the sheet 59 in properly feeding the crop material into the feeder house. Stops may be provided to prevent the rotary feed member from engaging the sheet 59 which could cause damage. Thus the rotary feed member has each of the ends thereof located inwardly of the respective side draper such that the rotary feed member when moved downwardly on its mounting assembly to a lowermost position has at least part of its periphery between the inner ends of the side drapers as it extends closely adjacent the sheet 59. It is also located in a position so that it co-operates with a feeder chain at all times during its operation and during its movement.

The location of the pivot axis of the support arms at the rear end 60, that is behind the rotary feed member, rather than in front of the rotary feed member at the position between the draper and the pan, has the advantage that it reduces the effect of changes of angle of the support member on the feed direction of the crop toward the rotary feed member. Thus the crop is nearly at a tangent to the rotary feed member regardless of the height of the cutter bar, as the header floats, relative to the rotary feed member which remains at a common height with the feeder house.

However, it is not essential that the feed draper be mounted on a common pivotal support with the pan under the rotary feed member and, in an alternative arrangement (not shown) the pan can be fixed on the mounting 16 with the feeder house and the feed draper mounted in front of it on arms which pivot about a horizontal axis across the front of the pan.

In a further modified arrangement (not shown) in which the draper 23 can extend to the feeder house and the pan 59 is omitted. Thus in this case the rotary feed member 70 co-operates with the upper run of the draper in feeding the material into the feeder house.

The arrangement in which the rotary feed member is narrow enough to fit between the side drapers has the advantage that the rotary feed member can cooperate with the pan (or with the feed draper) in close proximity to provide an effective feeding action, but at the same time, the side drapers and the cutter bar can be moved rearwardly toward the feeder house. This has the advantages that it improves lines of sight from the cab to the cutter bar and table and also it reduces the amount cantilever of the header from the feeder house.

Turning now to FIGS. 4 through 8, further detail of the feed draper is shown.

It will be noted that from FIG. 2A that the side drapers have a front edge 101 which is located immediately adjacent the cutter bar so the crop material falling from the cutter bar is carried on the side drapers towards the feed draper at the center.

The feed draper is located underneath the side draper so that side edges of the feed draper extend underneath the side drapers so as to reduce the tendency of crop to be carried back underneath the side drapers. Thus the side edges of the feed draper tend to strip the material from the side drapers to ensure that as much as possible the crop is carried from the side drapers rearwardly by the feed draper to the feeder house.

In order to minimize the height of the cutter bar and to bring the cutter bar as close as possible to the ground, with the feed draper located underneath the side drapers, it is necessary to locate the front roller 102 of the feed draper rearwardly of the front edge 101 of the side drapers and rearwardly of the cutter bar. This leaves a triangular area 103 in front of the feed draper in which crop material is not stripped by the feed draper but instead can enter into this triangular area. The size of the triangular area is minimized both in height and in length from the cutter bar in order to minimize the amount of crop material which can enter this triangular area. For this purpose the front roller 10 of the feed draper is provided with a diameter which is the minimum which can be accommodated while allowing proper movement of the feed draper around the roller. In practice this diameter has been found that it can be reduced to a range of 2.0 down to 1.5 inches in outside diameter by providing modifications to the construction of the feed draper which allow it to pass around a guide roller of this small diameter. Such a small diameter allows the front of the feed draper to be moved sufficiently forwardly underneath the side drapers so as to allow operation of the system without unacceptable numbers of blockages occurring in the triangular area 103.

It is well known that feed drapers of this type require the provision of cleats on the outside surface of the draper canvas so as to assist in carrying the crop along the canvas to the required discharge point. It is also well known that the draper canvas is formed in an elongate sheet which requires a transverse connection holding the two ends together. Both the cleats and the connector must pass around the roller.

Figure 4:
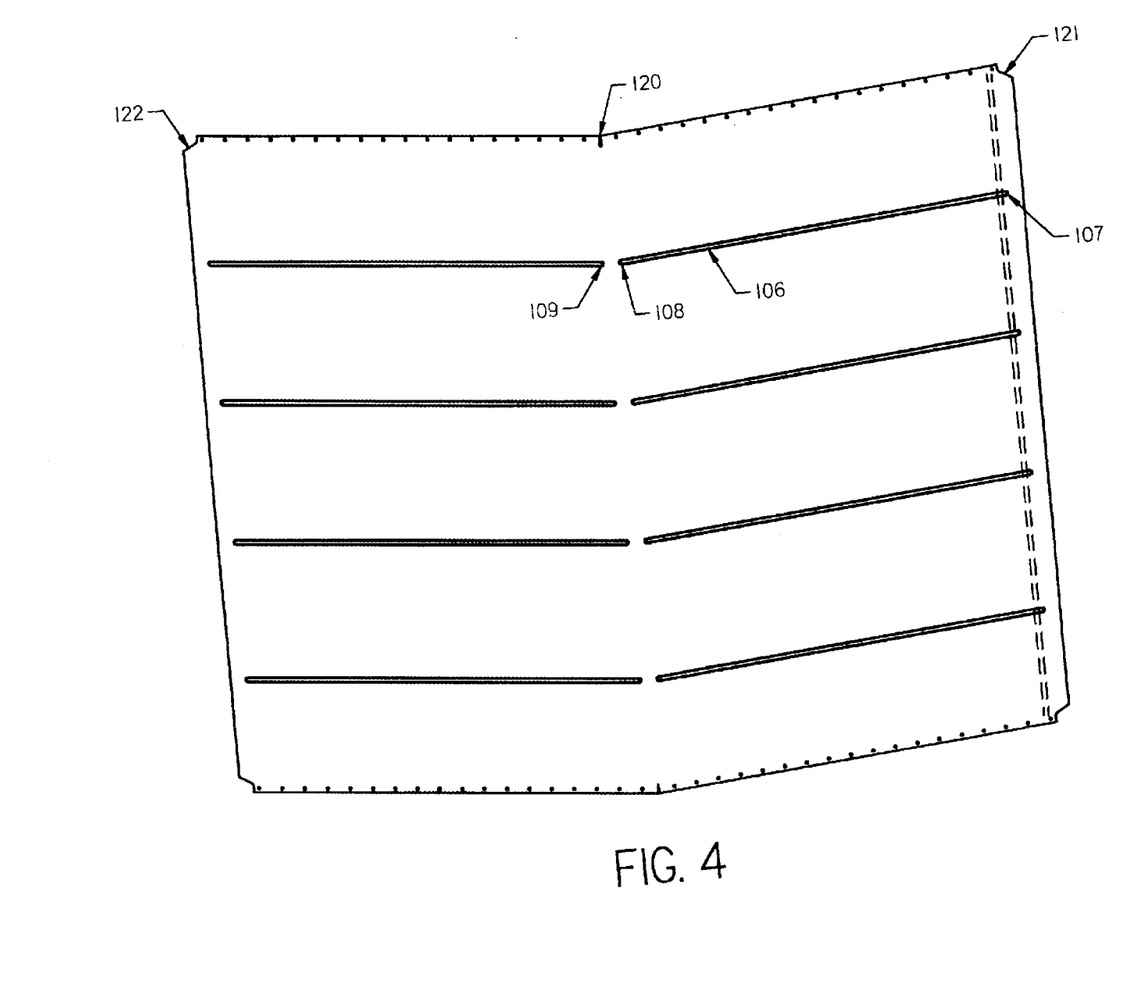
FIG. 4 is a top plan view of the feed draper only of the header of FIG. 1.
Figure 5:
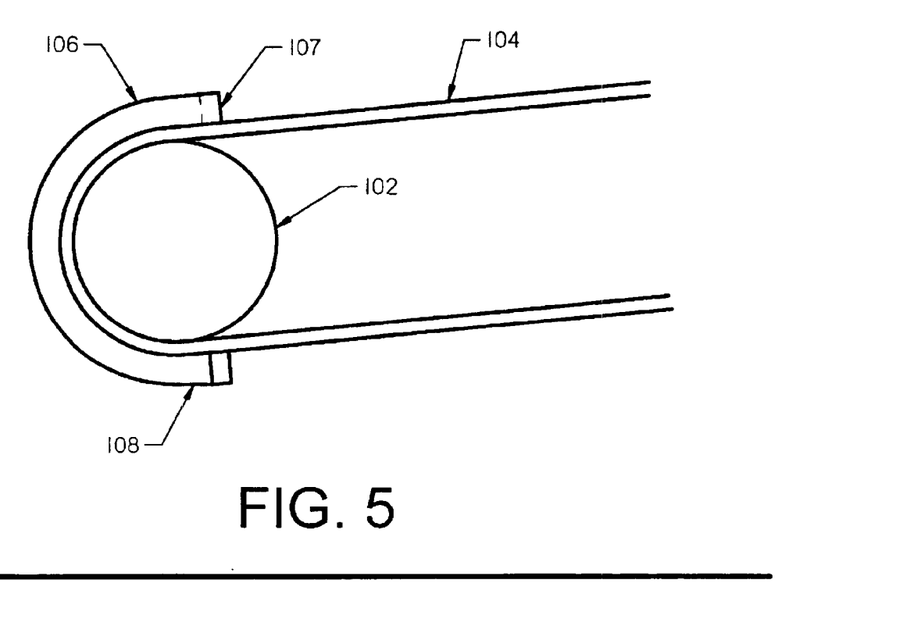
FIG. 5 is a side elevational view of the front roller of the feed draper of the header of FIG. 1.
Figure 6:
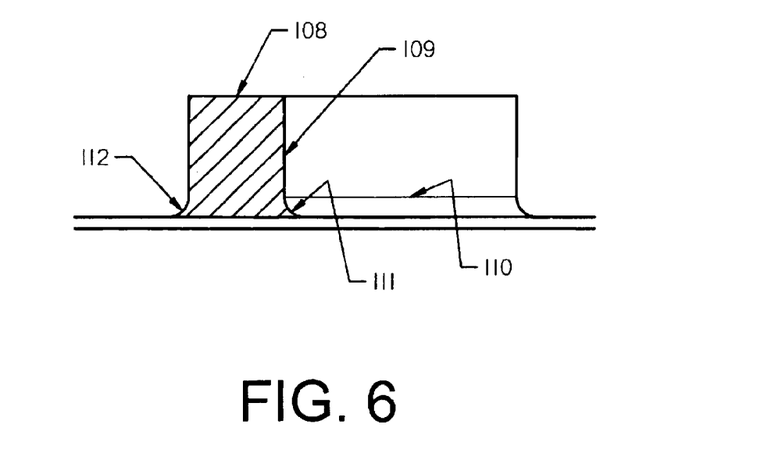
FIG. 6 is a cross sectional view of the draper canvas of the feed draper of the header of FIG. 1.

Thus the feed draper 50 comprises a front roller 102 of smaller diameter, a rear roller 23 and a draper canvas 104 wrapped around the front and rear rollers. The rollers are mounted on suitable bearings and one of the rollers is driven to provide the required longitudinal movement of the canvas. The cleats 106 are shown in FIGS. 4, 5 and 6. The cleats are formed in two sections each extending from an outer edge 107 to a position 108 at the center line with the two sections being spaced so as to leave an opening 109 at the center line of the draper. The two sections are angled relative to line transverse to the draper. In the embodiment shown the two angled sections thus form in effect an apex and the apex is arranged so that it is leading relative to the side edges so that the end 108 of each section of the cleat is ahead of the end 107 in the direction of movement from the front roller toward the rear roller. This arrangement with the apex leading has been found to avoid or reduce the possibility of creases or wrinkles forming in the canvas by a tendency to pull the canvas inwardly. Instead the leading apex tends to move such wrinkles or creases outwardly toward the outer edge and thus provide a better tracking of the canvas.

The cleats are formed wholly from a resilient material such as natural or synthetic rubber which is formed to provide a generally rectangular body as best shown in FIG. 6 with a flat top 108 and flat sides 109. The sides are parallel and the top is parallel to the canvas. The cleat is attached to the canvas by a slight flaring of the sides at the base to provide a slightly wider base and more aggressive adhesion of the cleat to the rubber coating 110 formed on the canvas. The height of the cleat is greater than its width so as to provide a relatively aggressive action by the vertical shoulder defined by the side 109.

The angle of the cleat relative to a line transverse to the canvas provides an arrangement in which the leading end 108 of the cleat passes around the roller 102 ahead of the remainder of the cleat and ahead of the trailing end 107. This angle therefore tends to pull the cleat from the end 108 providing a force along the length of the cleat. In this way pulling forces on the leading edge 111 and trailing edge 112 of the cleat at their points of connection with the canvas are reduced since some of those forces are transferred into longitudinal pulling forces along the length of the cleat. Thus the tendency of the cleat to break-away from its connection with the canvas at the leading and trailing edges is significantly reduced by transferring the forces pulling on the cleat from forces which are wholly transverse to the cleat to forces which includes some forces longitudinal of the cleat. The angle is thus selected so that it is basically the minimum angle which reduces the forces to a degree sufficient to prevent premature breaking of the cleat from its connection to the canvas.

Figure 7:
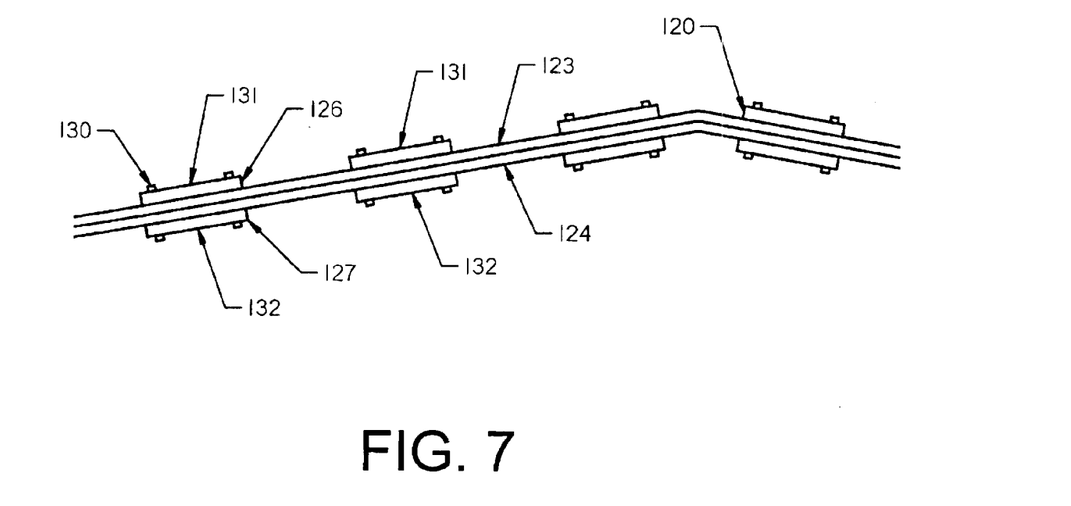
FIG. 7 is a top plan view of the draper canvas of the feed draper of the header of FIG. 1, showing the connection member connecting ends of the canvas.
Figure 8:
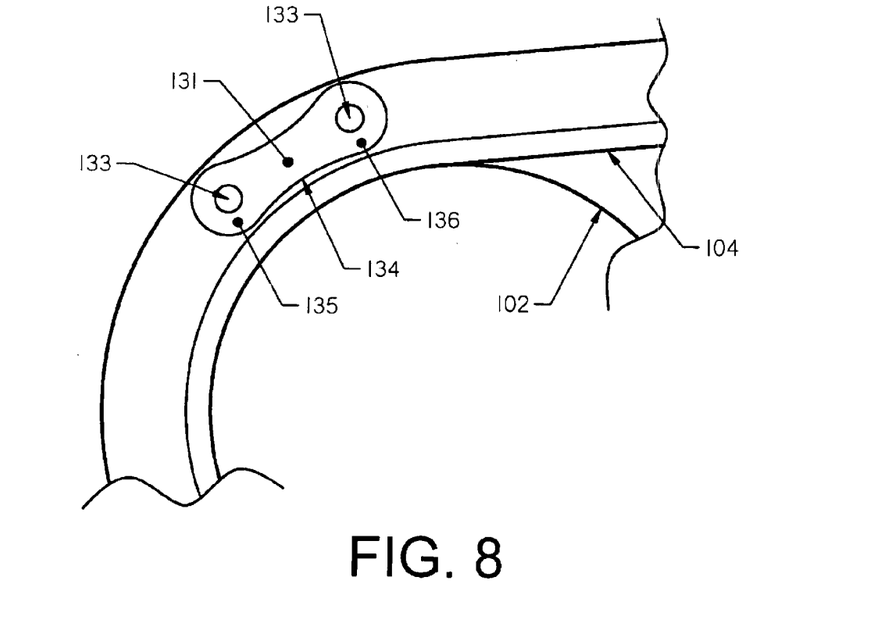
FIG. 8 is a cross sectional view of the draper canvas of the feed draper of the header of FIG. 1, showing the connection member passing over the front roller.

In order to reduce the forces on the connector, the connector shown in FIGS. 7 and 8 is also formed into the same shape as the cleat with an apex 120 and two trailing ends 121 and 122. The connection is formed by bending two edge pieces 123 and 124 upwardly from the plane of the canvas and then clamping those two edge pieces together by connector members 126 and 127 on each side of the edge pieces.

Conventionally such connectors are rigid strip members which connect along each side of the upturned edges and are fastened together by bolts 130. However in view of the flexibility required for the connector to pass around the roller 102 in view of the fact that the apex 120 leads and thus requires the connector to bend in the same manner as the cleat as shown in FIG. 5, the connectors are formed in separate pieces. Thus each separate piece 131 on one side and 132 on the other side is fastened by two bolts 130 which pass through holes 133 in the connectors. The connectors are shaped with a concave bottom surface 134 between the two ends 135 and 136 where the holes 133 are located. The concave surface faces the canvas 104 and the roller 102. Thus as the connector passes around the roller 102, one end 136 of the connector 131 and its corresponding connector 132 on the other side is in advance of the other end so that the connector extends over the roller 102 at an angle to the axis of the roller equal to the angle of the connector relative to the line transverse to the canvas. In view of this angle, the roller forms a convex surface portion which projects into and matches the concave curvature 134 so that there is less forces against the connector and thus against the canvas 104 located between the connector and the roller.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

What is claimed is:

1. A crop harvesting header comprising:

a main frame structure extending across between two ends of the header across a width of the header for movement in a direction generally at right angles to the width across ground including a crop to be harvested;

a crop receiving table carried on the main frame structure across the width of the header;

a cutter bar across a front of the table carrying a cutter operable for cutting the crop as the header is moved forwardly across the ground for depositing the crop onto the table;

and a crop transport system for moving the cut crop toward a discharge location of the header;

the crop transport system including a crop transport draper having a first end roller, a second end roller parallel to and spaced from the first end roller and a draper canvas wrapped around the rollers for movement around the rollers longitudinally of the canvas in a crop transporting direction;

the draper canvas having on its outer surface a plurality of generally transversely extending longitudinally spaced cleats attached to the outer surface and extending outwardly therefrom for engaging the cop and providing a longitudinal force on the crop;

each cleat comprising a strip of resilient material attached to the outer surface such that the length of the strip is at an angle to a line at right angles to the longitudinal direction so that, as the strip passes around the rollers, one end of the strip passes around angularly in advance of the other end.

2. The crop harvesting header according to claim 1 wherein each cleat comprises two strips of resilient material which are arranged at opposite angles to as to converge from outer ends of the strips to an apex substantially on a center line of the draper canvas.

3. The crop harvesting header according to claim 2 wherein the cleats are arranged on the canvas such that the apex is arranged in advance of the outer ends.

4. The crop harvesting header according to claim 2 wherein the two strips are separated at the apex so as to leave a portion of the canvas at the center line which is free from the cleat.

5. The crop harvesting header according to claim 1 wherein each cleat in cross-section is generally rectangular with a height greater than its width.

6. The crop harvesting header according to claim 1 wherein the angle is less than 15 degrees and preferably of the order of 5 degrees.

7. The crop harvesting header according to claim 1 wherein the canvas includes at least one end to end connection defined by two end portions of the canvas which are bent outwardly of the draper and connected together by threaded fasteners passing through the end portions to hold them connected and wherein the end portions are arranged at an angle to a line at right angles to the longitudinal direction so that, as the connection passes around the rollers, one end of the connection passes around angularly in advance of the other end.

8. The crop harvesting header according to claim 7 wherein the end connection is parallel to the cleats.

9. The crop harvesting header according to claim 7 wherein the end connection includes a plurality of pairs of separate reinforcing connectors each reinforcing connector having a pair of holes therein engaging onto a pair of the threaded fasteners which hold the pair of reinforcing connectors against the outside surfaces of the end portions, whereby the end connection can flex as it passes around the roller.

10. The crop harvesting header according to claim 9 wherein each reinforcing connector has a surface facing the roller which is concave so as to match the convex surface of the roller.

11. The crop harvesting header according to claim 1 wherein at least one of the rollers has an outer diameter less than 2.0 inches.

12. The crop harvesting header according to claim 1 wherein at least one of the rollers has an outer diameter of the order of 1.5 inches.

13. The crop harvesting header according to claim 1 wherein the crop transport system includes a first side draper having an outer end guide roller at a first end of the header, an inner end guide roller adjacent the discharge location and a continuous draper canvas wrapped around the outer and inner guide rollers to define a top run of the canvas for carrying the cut crop from the knife across the header to a discharge end adjacent the discharge location; and a second side draper having an outer end guide roller at a second end of the header, an inner end guide roller adjacent the discharge location and a continuous draper canvas wrapped around the outer and inner guide rollers to define a top run of the canvas for carrying the cut crop from the knife across the header to a discharge end adjacent the discharge location; wherein the crop transport draper comprises a feed draper located at the discharge location and including a front guide roller adjacent the cutter bar and a rear guide roller behind the front guide roller and a draper for carrying the crop material rearwardly toward a discharge opening of the header.

14. The crop harvesting header according to claim 13 wherein the side drapers have a front edge at the cutter bar and the feed draper has a width greater than the spacing between the inner ends of the side drapers so as to extend underneath the inner ends of the side drapers with the front guide roller arranged close to the underside of the side drapers and to the cutter bar and the rear guide roller spaced away from the underside of the side drapers.

15. The crop harvesting header according to claim 14 wherein the front guide roller has an outer diameter less than 2.0 inches.

16. The crop harvesting header according to claim 14 wherein the front guide roller has an outer diameter of the order of 1.5 inches.

17. The crop harvesting header according to claim 13 wherein each cleat comprises two strips of resilient material which are arranged at opposite angles to as to converge from outer ends of the strips to an apex substantially on a center line of the draper canvas.

18. The crop harvesting header according to claim 17 wherein the cleats are arranged on the canvas such that the apex is arranged in advance of the outer ends.

19. The crop harvesting header according to claim 13 wherein there is provided a rotary feed member at the discharge location arranged such that the crop is fed underneath the rotary feed member, the rotary feed member being mounted on a mounting assembly for upward and downward movement within the discharge location.

20. The crop harvesting header according to claim 19 wherein the rotary feed member has a length between ends thereof which is less than the spacing between the side drapers; the rotary feed member having each of the ends thereof located inwardly of the respective side draper such that the rotary feed member when moved downwardly on its mounting assembly to a lowermost position has at least part of its periphery between the inner ends of the side drapers and the rotary feed member being arranged to extend to a forward edge at a position forwardly of a rear of the side drapers.

21. A crop harvesting header comprising:
    a main frame structure extending across between two ends of the header across a width of the header for movement in a direction generally at right angles to the width across ground including a crop to be harvested;
    a crop receiving table carried on the main frame structure across the width of the header;
    a cutter bar across a front of the table carrying a cutter operable for cutting the crop as the header is moved forwardly across the ground for depositing the crop onto the table;
    and a crop transport system for moving the cut crop toward a discharge location of the header;
    the crop transport system including a crop transport draper having a first end roller, a second end roller parallel to and spaced from the first end roller and a draper canvas wrapped around the rollers for movement around the rollers longitudinally of the canvas in a crop transporting direction;
    wherein the canvas includes at least one end to end connection defined by two end portions of the canvas which are bent outwardly of the draper and connected together by threaded fasteners passing through the end portions to hold them connected and wherein the end portions are arranged at an angle to a line at right angles to the longitudinal direction so that, as the connection passes around the rollers, one end of the connection passes around angularly in advance of the other end.

22. The crop harvesting header according to claim 21 wherein the end connection includes a plurality of pairs of separate reinforcing connectors each reinforcing connector having a pair of holes therein engaging onto a pair of the threaded fasteners which hold the pair of reinforcing connectors against the outside surfaces of the end portions, whereby the end connection can flex as it passes around the roller.

23. The crop harvesting header according to claim 21 wherein each reinforcing connector has a surface facing the roller which is concave so as to match the convex surface of the roller.

* * * * *